(12) United States Patent
Lion

(10) Patent No.: US 8,033,713 B2
(45) Date of Patent: Oct. 11, 2011

(54) WHISK, IN PARTICULAR FOR CULINARY USE

(75) Inventor: Mathieu Lion, Paris (FR)

(73) Assignee: Mastrad SA, Paris (FR)

( * ) Notice: Subject to any disclaimer, the term of this patent is extended or adjusted under 35 U.S.C. 154(b) by 580 days.

(21) Appl. No.: 11/840,341

(22) Filed: Aug. 17, 2007

(65) Prior Publication Data
US 2008/0043568 A1 Feb. 21, 2008

(30) Foreign Application Priority Data
Aug. 18, 2006 (FR) .................................... 06 07387

(51) Int. Cl.
*A47J 43/10* (2006.01)
(52) U.S. Cl. ..................................... 366/129; 416/70 R
(58) Field of Classification Search .............. 7/110, 112; 30/298.4, 327; 294/7, 8; 366/129; 416/69, 416/70 R; D7/690
See application file for complete search history.

(56) References Cited

U.S. PATENT DOCUMENTS

| | | | | | |
|---|---|---|---|---|---|
| 148,355 | A | * | 3/1874 | Dennett | 248/37.6 |
| 401,058 | A | * | 4/1889 | Pfau | 416/70 R |
| 1,410,522 | A | * | 3/1922 | Ziemba | 416/70 R |
| 1,519,606 | A | * | 12/1924 | De Vore | 416/70 R |
| 1,649,874 | A | * | 11/1927 | Taylor | 99/499 |
| 1,654,965 | A | * | 1/1928 | Daniels et al. | 416/70 R |
| 1,836,014 | A | * | 12/1931 | Chamberlain | 30/327 |
| 2,126,890 | A | * | 8/1938 | Jensen | 366/129 |
| 2,231,402 | A | * | 2/1941 | Whitman | 30/327 |
| D143,247 | S | * | 12/1945 | Storm | D7/690 |
| 2,482,587 | A | * | 9/1949 | Hughes | 416/70 R |
| 2,492,042 | A | * | 12/1949 | Hoffman | 248/112 |
| 2,499,074 | A | * | 2/1950 | Nordgarden | 416/70 R |
| 2,669,018 | A | * | 2/1954 | Smith | 30/129 |
| 2,676,830 | A | * | 4/1954 | Lawson | 294/7 |
| 2,713,469 | A | * | 7/1955 | Wright | 248/229.26 |
| 3,149,824 | A | * | 9/1964 | Albano | 366/144 |
| 4,231,128 | A | | 11/1980 | James | |
| 4,575,255 | A | * | 3/1986 | Kafka | 366/129 |
| D293,756 | S | * | 1/1988 | Benson | D7/641 |
| D304,009 | S | * | 10/1989 | Gecchelin | D7/690 |

(Continued)

FOREIGN PATENT DOCUMENTS

CA 2489633 A1 * 7/2006

(Continued)

OTHER PUBLICATIONS

Images of Egg-Whisky whisk: Seattle Bon Vivant, weblog entry Oct. 8, 2005, and current Amazon page for book referenced by the entry; attached to end, photos taken by examiner for illustration purposes 10/27-28/09.*

*Primary Examiner* — David Sorkin
(74) *Attorney, Agent, or Firm* — Cowan, Liebowitz & Latman, P.C.; Mark Montague, Esq.

(57) ABSTRACT

A whisk, in particular for culinary use, having a handle and an active part with a predominately pear-shaped general shape and that is mounted on the handle. The whisk also includes an attachment clip mounted on the handle and that has a spatula-shaped end part at its free end. The attachment clip rests on the active part of the whisk and has an angled shape with a concavity that is turned towards the inside of the whisk.

13 Claims, 5 Drawing Sheets

U.S. PATENT DOCUMENTS

| | | | |
|---|---|---|---|
| 5,219,223 A * | 6/1993 | Schmitt | 366/129 |
| 5,947,595 A * | 9/1999 | Eurisch et al. | 366/129 |
| 6,206,561 B1 * | 3/2001 | Hefti | 366/129 |
| 6,234,662 B1 * | 5/2001 | Blake | 366/129 |
| 6,257,752 B1 * | 7/2001 | Browne | 366/129 |
| 6,273,602 B1 * | 8/2001 | Steiner et al. | 366/129 |
| D556,521 S * | 12/2007 | Lion et al. | D7/690 |
| D584,928 S * | 1/2009 | Eide et al. | D7/690 |
| 2002/0003749 A1 * | 1/2002 | Browne | 366/129 |
| 2003/0034662 A1 * | 2/2003 | Wilson | 294/7 |
| 2005/0083777 A1 * | 4/2005 | Browne | 366/129 |
| 2006/0050606 A1 * | 3/2006 | Overthun et al. | 366/129 |
| 2006/0053638 A1 * | 3/2006 | Sumner-Trivisani et al. | 30/298.4 |
| 2006/0185177 A1 * | 8/2006 | Simard | 30/327 |
| 2006/0187745 A1 * | 8/2006 | Fung | 366/129 |
| 2007/0006470 A1 * | 1/2007 | Sumner-Trivisani et al. | 30/298.4 |
| 2008/0060206 A1 * | 3/2008 | DeSalvo | 30/327 |
| 2009/0123624 A1 * | 5/2009 | Missakian | 426/523 |
| 2009/0229130 A1 * | 9/2009 | Swierski et al. | 30/123 |

FOREIGN PATENT DOCUMENTS

| | | |
|---|---|---|
| EP | 0187208 | 1/1986 |
| EP | 1683455 | 7/2006 |
| FR | 2805725 | 9/2001 |

* cited by examiner

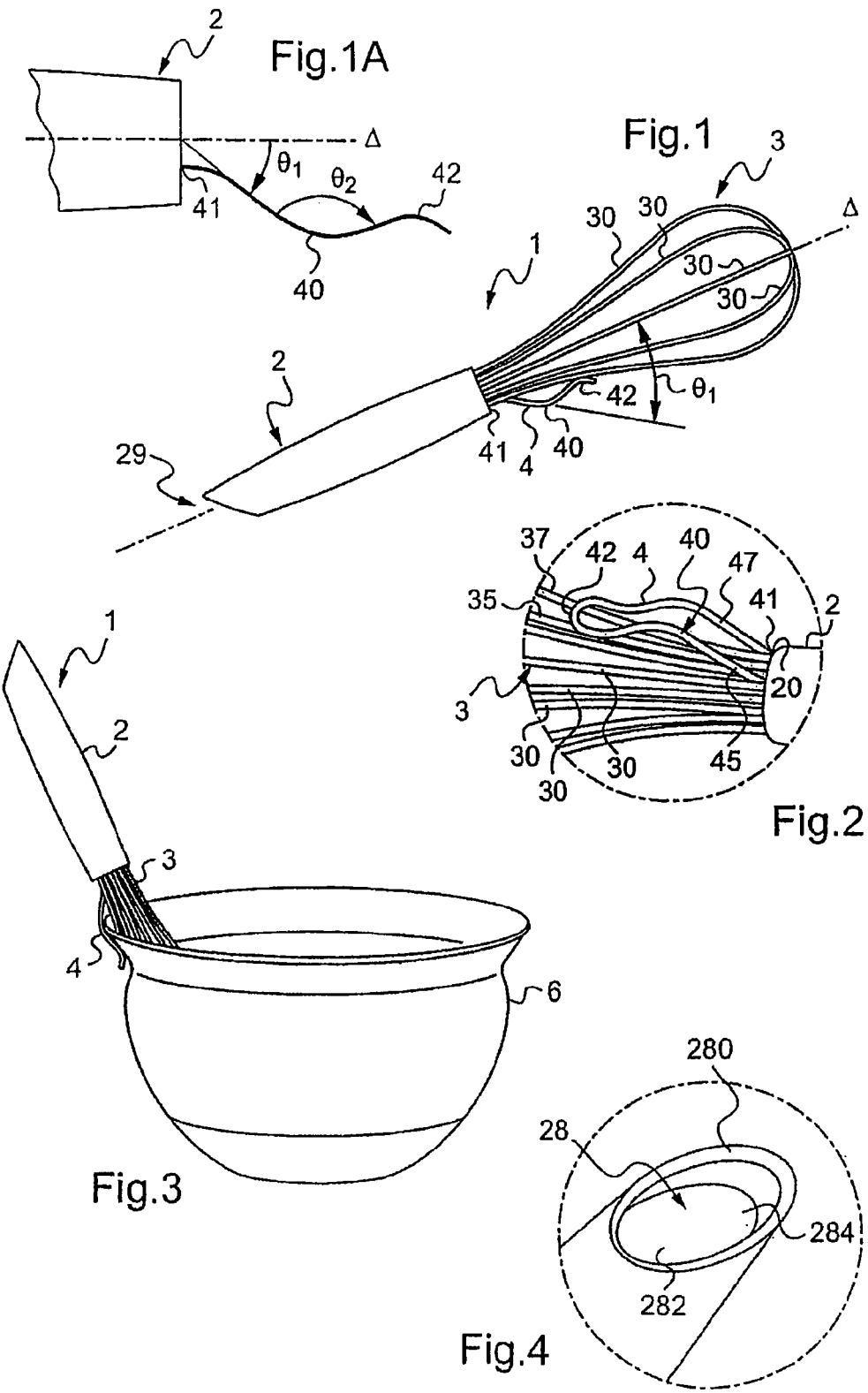

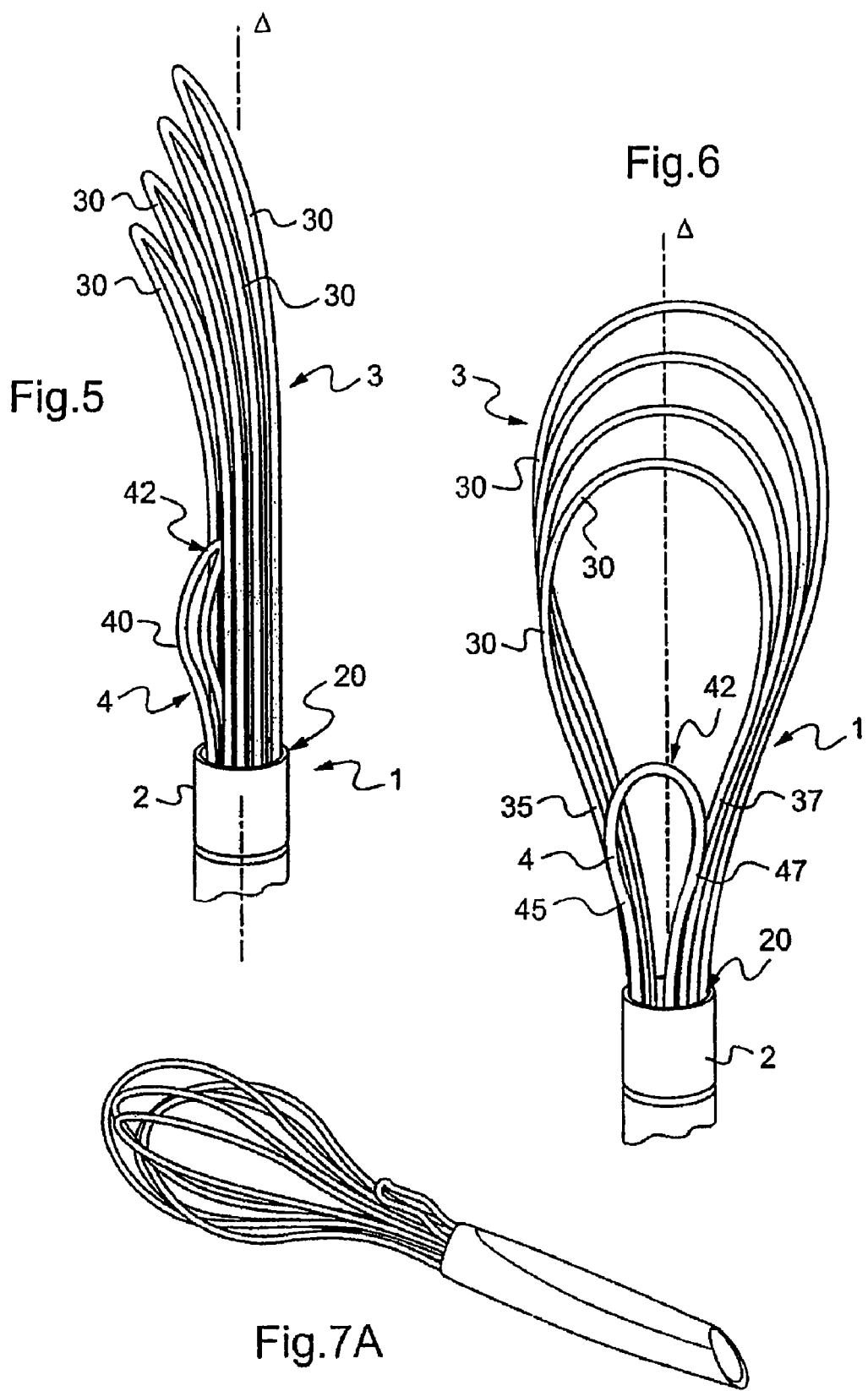

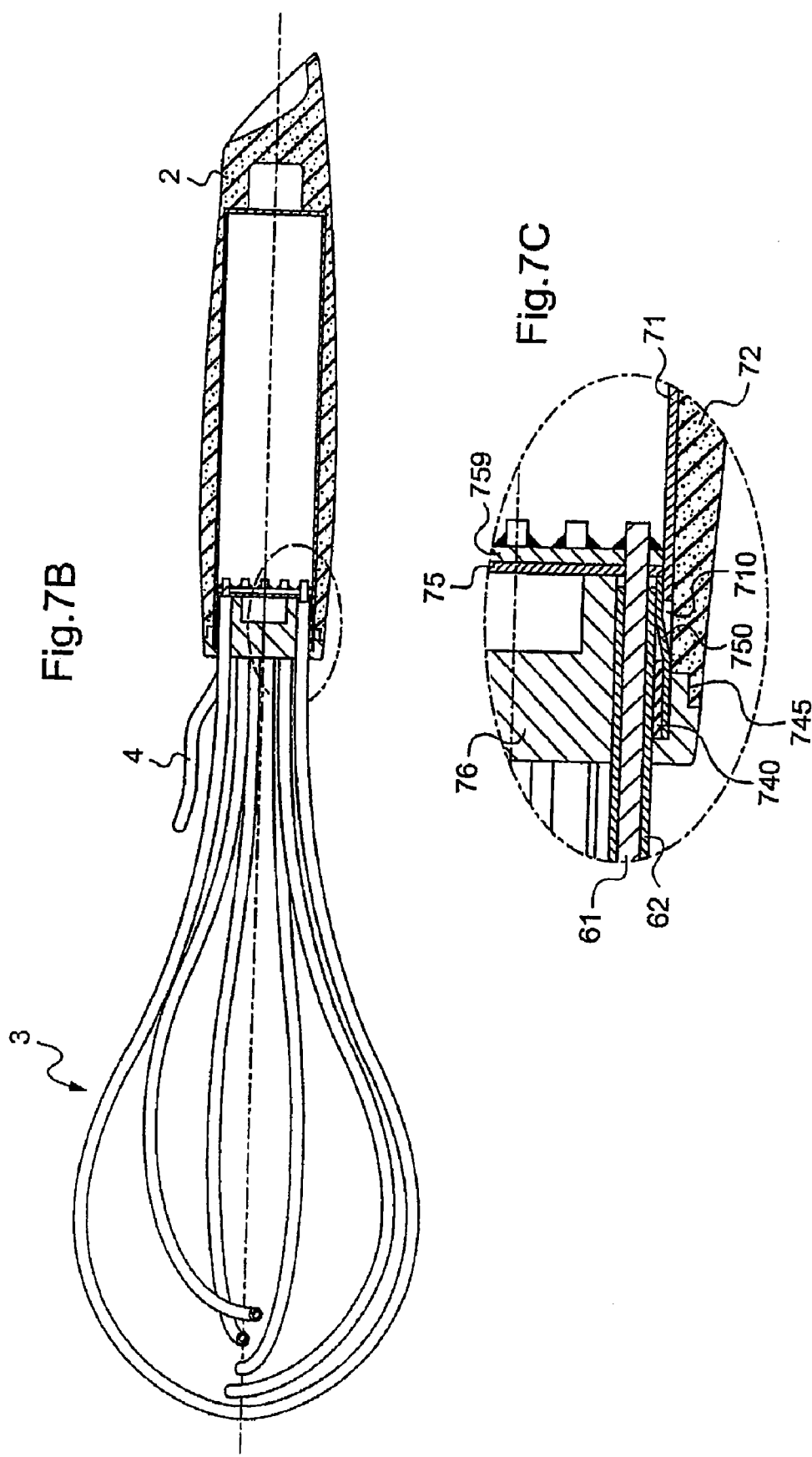

WHISK, IN PARTICULAR FOR CULINARY USE

CLAIM OF PRIORITY

This application claims the benefit of French Patent Applications No. 06/07387, filed on Aug. 18, 2006, the entire contents of which are hereby incorporated by reference herein.

FIELD OF THE INVENTION

The present invention relates to whisks, in particular for culinary use, for mixing ingredients in a container, for example, a mixing bowl.

BACKGROUND OF THE INVENTION

Conventional whisks include a handle and a bundle of shafts, which make up an "active part" that extends from the handle. The active part generally is pear-shaped and designed to optimize mixing ingredients.

After a user discontinues using a conventional whisk, the user generally places the whisk within the mixing bowl, rests the whisk across the top surface of the bowl, or places the whisk on a plate of some sort. One problem with placing the whisk outside the container, such as on a plate, is that mixed ingredients remaining on the whisk's active part drip off onto the plate and, thus, become unusable. If the whisk is placed within the bowl, it is likely that the whisk will slide down (i.e., fall over) thereby causing the whisk's handle to contact the ingredients being mixed.

In an attempt to avoid the aforementioned problems associated with using conventional whisks, additional supporting elements have been designed that allow the user to attach the whisk to the rim of the bowl when not in use. Unfortunately, such items generally are intended for utensils that have long thin handles, such as serving utensils, and therefore are poorly suited for use with whisks. Moreover, these devices often are not in easy reach of a user, and sometimes are simply forgotten about or get lost. Still further, using these types of supporting elements, including positioning them on the container or bowl and their subsequent removal after use, complicates and extends the mixing operation.

Another technique that attempts to address the foregoing problems is to include an open-ended hook on the utensil's handle. After the utensil is used, its hook may be placed on the edge of the bowl or container so that the utensil conveniently hangs down from the side of the container. However, such hooks generally are designed for utensils with long thin handles and typically only for those utensils that are used to serve food, such as ladles and spoons. Unfortunately, hooks are ill-suited for whisks for at least two reasons. First, whisks generally have a relatively short handle and thus it is too easy for the user to grab the hook, and thus hurt oneself, when grabbing the whisk. Second, a whisk is used to stir ingredients within a bowl or other receptacle and thus requires strong, fast movement, which also may result in injury to the user during use if an open-ended hook is placed on the whisk's handle.

OBJECTS AND SUMMARY OF THE INVENTION

In view of the foregoing, it is an object of the present invention to provide a whisk that includes a mechanism allowing it to be easily hung from the edge of a container, but which is safe and easy to use.

To achieve the foregoing object, a whisk, in accordance with the present invention, includes a handle and a pear-shaped active part that extends from or is mounted on the handle. The active part generally includes plural distributed shafts. The whisk of the present invention also includes an attachment clip that is mounted on the handle, and which has spatula-shaped free end and which comes in close proximity to (i.e., nearly rests on) the whisk's active part. In particular, the attachment clip has an angled shape in its center with a concavity that is turned towards the inner part of the whisk.

The whisk having the previously described structure may be stably placed inside a container without the risk that the whisk will slide into the container. The whisk may be attached to edges of different thicknesses. The whisk may further be attached to containers having pronounced or reinforced rims. Still further, the whisk may be attached to various containers regardless of the particular materials from which they are made and regardless of the particular shape or angle of the edges of the containers, including the particular angle formed with the vertical axis in the area of the container's rim.

Additional features and aspects of the whisk with the present invention are provided below.

Some of the shafts of the active part may be folded back so as to form a loop at one of their ends.

The attachment clip may be shaped, placed and attached to produce an elastic resting force against the active part of the whisk.

The attachment clip may be designed to have a particular elasticity and flexibility so that flexing stiffness of the active part of the whisk is taken into account.

The attachment clip may have the shape of a short shaft, or a simple or folded back shape so as to form a loop at its free end.

The attachment clip may have two predominantly parallel branches.

The attachment clip may be formed from a solid part.

The free end of the attachment clip may be curved back towards the outside of the whisk.

The spatula-shaped end part of the attachment clip is designed to rest against at least one of the bundle's shafts.

The attachment clip may be made partially of the same material as the bundle's shafts.

The handle may be made partially of a silicone material, and particularly silicone rubber.

The free end of the handle may be hollow to provide a spatula or a scraper.

The shafts from the bundle and/or the attachment clip may be held in the handle by at least one of the techniques from the group: latching, welding and/or gluing.

The shafts from the bundle are distributed radially around the axis of the handle and the spatula-shaped end part of the attachment clip rests on the adjacent branches of two distinct shafts.

The shafts from the bundle are distributed in vertical planes passing by the axis of the handle and parallel to each other whereas the spatula-shaped end part of the attachment clip rests on the adjacent branches of a single shaft.

Various other objects, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 1 is a schematic illustration of the whisk in accordance with a first embodiment of the present invention;

FIG. 1a is a drawing showing the particular angles of the whisk's clip in accordance with the present invention;

FIG. 2 is an enlarged, partial diagram of the whisk, particularly showing the whisk's attachment clip;

FIG. 3 is a schematic illustration that shows the whisk of the present invention attached to a bowl in accordance with the present invention.

FIG. 4 is an enlarged illustration of the end of the handle shown in FIG. 1;

FIG. 5 is a side view of a whisk in accordance with a second embodiment of the present invention;

FIG. 6 is a front view of the whisk shown in FIG. 5;

FIGS. 7A, 7B and 7C are different views illustrating the particular manner of attachment to the handle of the whisk of the present invention;

DETAILED DESCRIPTION OF THE PRESENT INVENTION

Figure 8A:
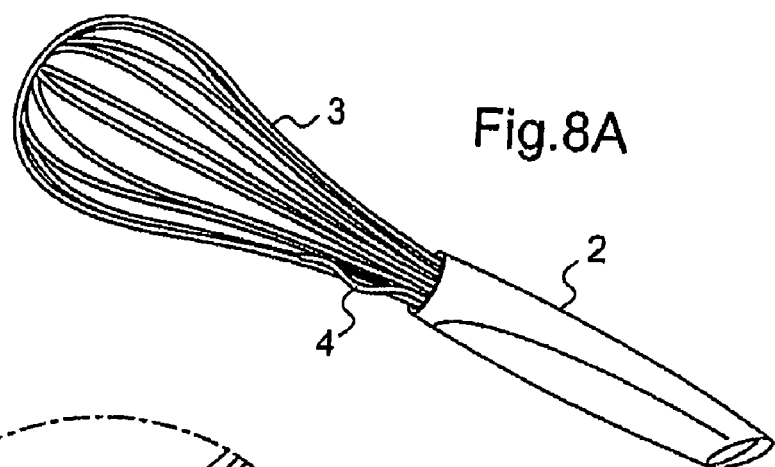
FIGS. 8A, 8B, 8C and 8D are various views illustrating another embodiment of the present invention.

FIG. 1 schematically illustrates a kitchen utensil 1 in accordance with the present invention. Kitchen utensil 1, in its general sense, includes a handle and an active part. In the exemplary illustration, kitchen utensil 1 is a whisk and, accordingly, the active part is the bundle of shafts mounted on the utensil's handle. As shown in FIG. 1, the whisk generally has a pear-shaped design, and is particularly adapted for optimizing the mixing of ingredients.

As shown in FIG. 1, whisk includes a handle 2 that extends along an axis Δ. The active part includes a bundle of semi-rigid shafts that are generally pear-shaped in design. During use, the user grasps handle 2 and utilizes the whisk in the ordinary manner. Preferably, the bundle 3 of shafts is adapted to mix a variety of products and ingredients, including liquids, such as sauces, liquid-solid combinations, and solids, such as soft dough.

As shown in FIG. 1, the bundle 3 has a set of shafts 30, with each shaft 30 having a loop shape. Shafts 30 extend from and are distributed around the handle's center axis Δ. The bundle 3 of the shafts is attached to handle 2 by a suitable connecting method, to be described further below.

As an optional feature of the present invention, the free end 29 of handle 2 has the design of a spatula or a scraper. As a scraper, the handle's free end may be used to scrape the bottom of containers. As shown in FIG. 4, the handle's free end 29 may include peripheral edges that form an oval crown 280, and which is oblique relative to the bottom 282 of the scraper 28. Scraper 28 preferably is substantially perpendicular to the longitudinal axis Δ of the handle. Also, one side of the bottom 282 is shown on the surface of the oval crown 280. This is on the inside substantially cylindrical with the connection 284 towards the bottom 282.

In accordance with the present invention, the whisk includes an attachment clip 4 as particularly shown in FIG. 2. Attachment clip 4 is sized and shaped to keep the whisk adjoined to the rim of a suitable container, for example, a salad bowl, when not in use. Due to its design, attachment clip 4 is able to keep the whisk attached to the side of a suitable container or mixing bowl or other item for a short or long period of time FIG. 3 is an exemplary illustration that shows whisk 1 attached to the edge of a container 6 in accordance with the present invention. As shown, the rim of container 6 is disposed between the whisk's active part 3 and the whisk's attachment clip 4. Specifically, the whisk attachments follows clip 4 along the geometric envelope of the active part of the whisk. Thus, the whisk 1 is secured and balanced without risk that it will fall into the mixture, or slide completely into the container. By being securely held, any ingredients that remain on the whisk are able to flow back into the container. Therefore, none of the mixture becomes unusable. Further, the invention alleviates the need for a supplemental support utensil, such as a plate on which to place the whisk.

Attachment clip 4 has a spatula-shaped end part at its free end 42, which is designed to urge against (rest on) the active part of the whisk 3. When the whisk is fixed on container 6, the clip is curved inward to grasp the edge of the container 6 between the active part 3 of the whisk and the attachment clip 4. The other end of the attachment clip 4 is fixed or mounted on the handle 2.

As shown in FIG. 1A, the attachment clip 4 has an angled shape 40 with a concavity that is turned towards the inside of the whisk. Clip 4 thus has two parts each located on a different side of the angled shape.

Referring again to FIG. 2, the inner part of the attachment clip, that is, the part located between the angled shape 40 and the handle mounted end 41 of the clip, is curved towards the outside of the handle and forms an angle $\theta_1$ relative to the axis Δ of the handle 2. The angle $\theta_1$ is preferably in the range of approximately 30° to 90° for the whisk's application. The outer part of the attachment clip 4, that is, the part located between the angled shape 40 and the free end 42, is curved towards the inside of the whisk. A summit angle $\theta_2$ is defined as the angle between components 40-41 and components 40-42. The angle $\theta_2$ is selected as a function of $\theta_1$ to optimize the attachment clip's ability to secure the whisk to the edge of a container. The angles are selected to enable a good elastic return force, without providing too much resistance when removing the whisk, on all types of containers whose thickness falls in the range of 0 to 40 mm. Preferably, the angle $\theta_2$ is in the range of approximately 90° to 135°, in particular for the geometry of the whisk according to FIG. 1. The attachment clip 4 may be partially made of the same material as shafts 30 of bundle 3.

The attachment clip 4 of the whisk of the present invention advantageously is shaped to produce an elastic return force between its free end 42 and the active part 3 of the whisk. In particular, the attachment clip 4 preferably is sufficiently elastic and flexible to allow its insertion into the rim of a container. Also, a stable and balanced attachment of the whisk on the container is provided by taking into account the material and thickness of the whisk's shafts.

The elasticity of the attachment clip 4 enables the placement of the whisk on any type of container, such as a salad bowl, sauce pan, round bottom mixing bowl, etc. The elastic return force exerted between the clip 4 and the active part 3 is adjusted in consideration of the thickness of these types of containers. The elasticity of the attachment is also adjusted in consideration of the respective shapes and materials of these containers as well as the angles formed by the clip from the side of its attachment ($\theta_1$) where the element of the active part of the whisk and/or comes in contact with the elements thereof ($\theta_2$).

In the exemplary whisk shown, the length of the clip is approximately 40 mm, or around one third of the length of the bundle of shafts. It is preferable that the length of the clip should not rise too much above ⅔ of the total length of the active part 3 and should not descend too far below one fourth of this length.

When the user attaches the whisk 1 onto the container 6, the clip 4 first separates slightly from the active part 3, and then elastically returns against the outer wall of the rim of the container 6 in such a manner to clasp it tightly.

The attachment clip 2 comes in the shape of a short shaft folded to form a loop in the area of the free end 42. The loop of the attachment clip 4 is curved towards the inside of the whisk 1 in a manner to define the spatula-shaped end part in the area of the free end 42.

In the particular embodiment shown in FIG. 2, the attachment clip 4 has two predominantly parallel branches 45 and 47, which are connected to the handle 2 on one end and are joined together at the other end to form the loop of the attachment clip 4.

The attachment clip 4 has a general shape similar to that of the shafts 30 of the bundle 3 on which it comes to rest. The invention further calls for forming the attachment clip 4 in a manner similar to the shafts 30 of the active part using the same materials and manner of connection to the handle 2.

The shafts of the active part of the whisk here are composed of molded steel wire molded, for example, by extrusion, coated with "silicone" (a silicone material such as silicone rubber used for culinary utensils). It has been observed that culinary containers made of steel coated with silicone offers a better hold ("grip") than steel on steel contact.

The free end 42 of the attachment clip 4 can be slightly curved back towards the outside of the whisk for easier insertion onto the rim of the container 6 between the clip 4 and the active part 3 of the whisk.

The elastic return force produced by the attachment clip 4 ensures a stable balance of the whisk on the rim of the container 6. This occurs even if the contact points between the spatula-shaped end part of the attachment clip 4 and the active part 3 of the whisk are located below the center of gravity of the whisk, which often occurs considering the lightness of the shafts when compared to the handle. As shown in FIG. 3, the whisk can thereby rest in its attachment position without the risk of falling in the container 6. This occurs independently of the position of the center of gravity of the whisk, the possible inclination of the container, and/or its thickness (rim included, if appropriate), and/or its material (metal, synthetic material, wood or ceramic).

In the kitchen, an instrument such as the whisk is used to mix or serve: ingredients in a sauce pan being heated on a burner; a hot composition in a baking dish in an oven and/or coming out of the oven; hot or cold substances likely to splatter and dirty clothes, tablecloths or the likes; and a hot or cold substance in a container held in the person's hand, while he or she is moving, while needing to carry other items (in particular another dish, table settings, drinks).

Mixing ingredients is often a repetitive action. In certain instances, the whisk must be removed from a mixture while keeping it ready for future use, by either cleaning it, or bringing it into contact with other materials likely to contaminate the mixture. Currently, there is no satisfactory solution. Placing the whisk on a clean plate clutters the workspace, and tends to cool the whisk. Fitting the whisk with an open hook like certain jam spoons is not suitable. Such hooks are not designed to be used with different types or sizes of rims. The hook also must be placed high on the handle in order to stabilize the whisk that is hooked on the edge and hanging towards the inside of the container. For most containers, the active part of the instrument will remain submerged in the mixture which is undesirable or even harmful to the desired results. For shallow containers, the hook cannot be used. One idea is to mount a mini clothespin that is glued to the kitchen instrument. The mini clothespin is unsuitable because the spring, which is susceptible to oxidation when washed, could be a source of dirt and contamination of the mixture, especially in the case of very sensitive emulsions. A clothespin also cannot be mounted close enough to the end of the whisk's active part sufficiently to maintain the necessary stability as mentioned above.

Before the present invention, there was no satisfactory solution suitable for nearly all the cases of domestic applications. With the present invention, it becomes possible to support the culinary instrument on the rim of the container, hanging towards the inside, without the whisk resting in contact with the mixture where it may be undesirable and harmful. This applies to many types of containers.

In the diagrams shown on the FIGS. 1 to 3, the shafts 30 of the active part of the whisk are distributed around the axis Δ of the handle 2. As displayed in FIG. 2, the spatula-shaped end part of the attachment clip 4 comes to rest on the adjacent branches 35 and 37. These shafts 30 are located on the same side as the attachment clip 4. In this depiction, the shafts 30 of the active part of the whisk are shaped to cross in the free end area of the active part 3 in the area of the axis Δ of the handle 2. The active part 3 of the whisk has a generally conical shape. The first part leaves from the connection end 20 of the handle 2 out to a point of the active part 3. The whisk also has a hemispherical shape on the second part which extends from the handle to the active part 3 and ends in the free end of the active part 3 of the whisk.

In a variation of the present invention, the shafts 30 from the active part 3 of the whisk are distributed in a predominately vertical plane passing in the area of the axis Δ of the handle, and parallel to each other as shown in FIGS. 5 and 6. As can be seen in these figures, the branches 45 and 47 of the attachment clip 4, rest on the branches 35 and 37 of a single adjacent shaft of the active part 3 of the spatula-shaped whisk.

In the second variation, the free ends of the shafts 30 of the active part 3 are slightly curved in a given direction relative to the axis of the handle 2. The spatula-shaped part located at the free end 42 of the attachment clip 4 is curved in the opposite direction. This is displayed in FIG. 7A, a perspective view of a specific implementation of the whisk.

FIG. 7B is a longitudinal section of the handle. The outermost shaft is fully illustrated. All the other elements including the clip 4 are cut in half to better show their placement. The axial gap at the end between the outer element and the closest adjacent elements is at least 2 mm. In addition, the gap at the end between adjacent elements is approximately 2.5 mm.

FIG. 7C illustrates a detail of the attachment to the handle. It shows that a shaft (from the clip 4 or the active part 3) includes, as a core, a steel wire 61 about 1.2 mm in diameter. On this core, a silicone sheath 62 is over molded for an outer diameter of approximately 2.3 mm.

Here, the handle 2 comprises a metal tube 71 forming a core on which a sheath 75 is molded over. The sheath defines the profile of the gripping zone of the handle 2. As shown in FIG. 7B, the length of the steel tube is approximately 104.5 mm. The steel tube goes to the inner wall of the bottom of the scraper 282 from the end of the handle side, so that it resists the stress of scraping.

From the other side, the tube 71 contains openings (710) which houses the tabs (such as the detail 750) stamped on the axial crown of a U-shaped base 75. The base 75 has a concavity that is turned towards the active part 3. The end 740 of the tube and that of the sheath 72 define a ring-shaped alveolar recess 745 which serves for gluing a silicone insert 76. This insert 76 forms a sealed cover cap for the attachment assembly.

The structure 61 and 62 of this shaft is described above. The metallic base 75 is adjusted to the inside diameter of the handle 2. Its radial part is reinforced by a disk 759 that is welded to it. The radial insert for the base 75 and its disk 759 are pre-drilled in order to receive the free end of the shaft, stripped of its silicone sheath. The silicone 76 is pre-drilled in a similar manner for receiving and housing the shaft with its silicone sheath. The cores of the shafts are welded to the disk 759 from the inner side of the handle. The following describes the sequence of the mounting: pre-drilling of the base 75 and 76, mounted on each other; for all the housings of the shafts; insertion to a little past the base of the previously stripped shafts then welding the shafts on the base; mounting this assembly on the annular recess 745 until clicking into 710, and then gluing it. The assembly is then sealed by gluing the silicone parts (handle and base) together.

The mounting is solid and can't be unmounted. In addition, it produces an excellent seal towards the inside of the handle. This is particularly advantageous in various categories from culinary applications of the tool to maintaining it and washing it in a dishwasher. However, the mounting could be made removable in applications where the seal may not be necessary. The manufacturing cost and time of the whisk from the invention remains analogous to that of a conventional whisk.

The whisk of the present invention has a simple structure and is easy to use. To attach it to a container, the user slides the whisk from top to bottom on the rim of the container such that the rim comes to lodge between the attachment clip 4 and the active part 3 of the whisk. The clip comes to grasp the container using its elastic return force. In the attached position, the clip 4 is outside the container and the active part of the whisk remains inside the container, without touching the mixture. Thus, the residual mixture which adheres to the whisk 1 during a previous use can flow directly into the container 6. Therefore, there is neither loss of the prepared mixture nor soiling on the support surface of the container. The whisk is effectively retained and avoids falling into the container 6. This applies, with the same whisk, for many types of mixtures and many shapes of containers.

For removing the whisk 1 from the container, the user simply pulls the whisk upward by the handle 2. The user can reuse the whisk at will.

The attachment clip 4 from the invention has a small bulk with fewer hidden surfaces, which makes it easier to clean. Because of its short length, the attachment clip does interfere with the shafts of the active part and therefore does not reduce the performance of the whisk. Further, the attachment clip 4 extends only in the area of the active part of the whisk and does not disturb the whisk handle when in use.

The whisk 1 of the present invention appears as a single block in which attachment clip 4's shape integrates harmoniously with that of the active part 3. It can therefore be stored and used in the same manner as a conventional whisk.

The whisk 1 of the present invention is not limited to culinary applications. Additional applications could include, for example, mixing paint or glue in a can. However, in this case, the constraints for use are not all the same. The invention is not limited to the variants described for purposes of non-limiting examples.

Thus, the active part can have a different general shape, symmetric or not, and comprise any number of shafts 30. In addition, looped shafts, half shafts, straight or not, provided with small weights at their free end, may be used.

The attachment clip 4 can be made up of different materials suited for the production of the elastic return force between the free end 42 of the clip 4 and the active part 3 of the whisk. Currently, a steel and/or culinary polymer, or the silicone material described above, are preferred.

The handle may be made up of different suitable materials. In particular, the handle 2 may be at least partially made up of silicone material such as silicone rubber. As a variant, other materials such as synthetic materials and/or polymers for culinary use, an organic elastomer material called TPR (Thermoplastic Rubber), or metal could be considered.

Figure 8B:
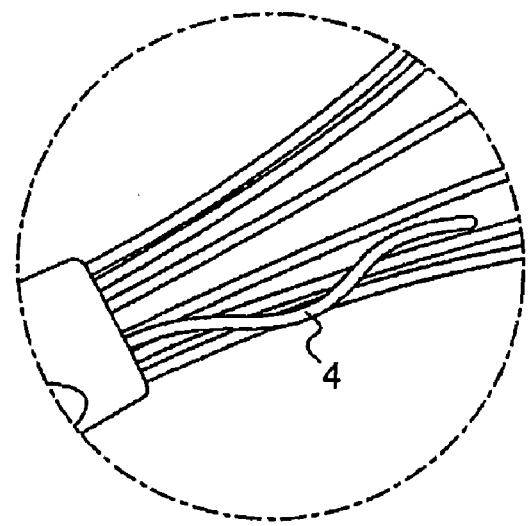
Figure 8D:
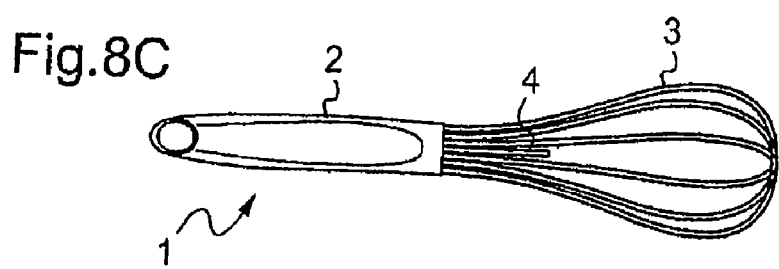
Figure 8C:
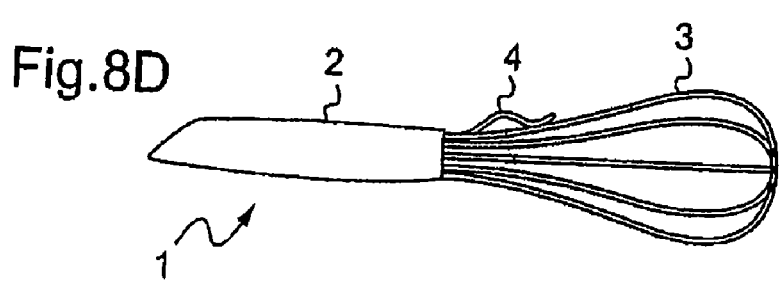
Figure 9A:
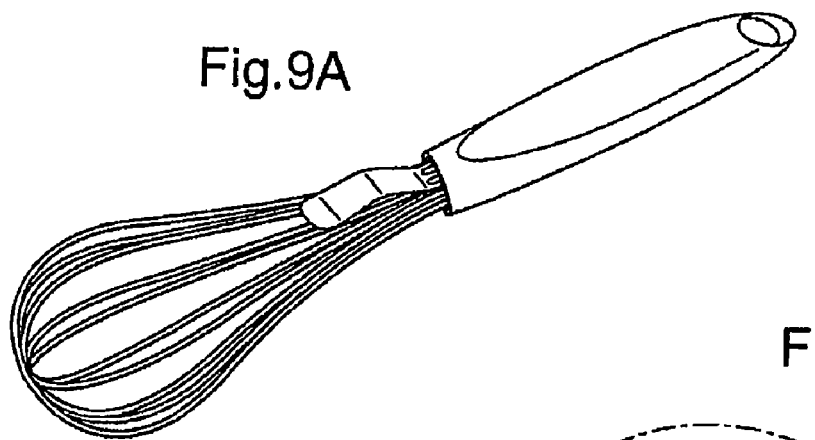
FIGS. 9A, 9B, 9C and 9D are various views illustrating a further embodiment of the present invention.
Figure 9B:
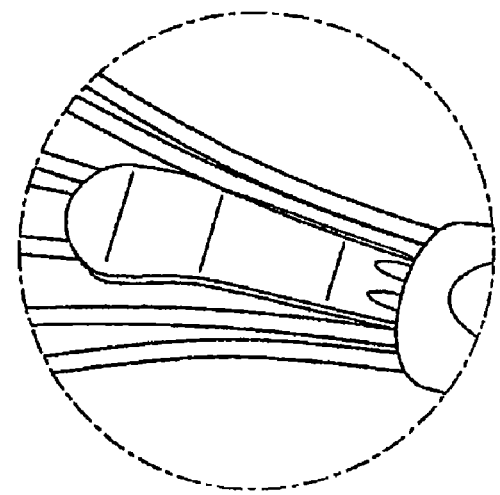
Figure 9C:
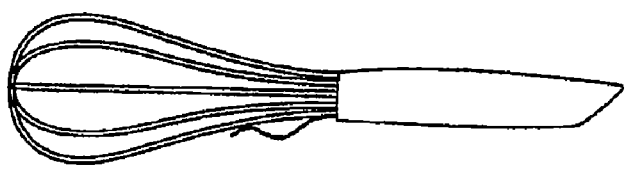
Figure 9D:
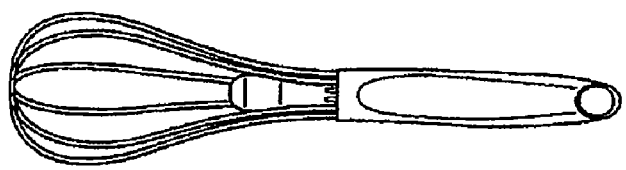

Two other implementation variants of the clip 4 are presented in reference to the group of FIGS. 8A-8D and 9A-9D. Apart from the clip 4, the assembly may be the same as previously mentioned.

In FIGS. 8A to 8D, the clip is formed from a single shaft cut at its end on the side of the active part of the whisk. This single shaft corresponds to a half shaft from the previous embodiments. It is folded back at its end to be entirely contained in a radial plane. Although this shaft could come to touch one of the other shafts, it is considered preferable that it be placed halfway between two active shafts. This allows working with the elastic return force on the geometric envelope of the active shaft so that it defines an arc of the circumference of the container.

In FIGS. 9A to 9D, the clip is formed by a unitary metal lip whose circumference is similar to that of the loop clip described above. On the handle side, the attachment could be done by a fork shaped configuration of this unitary clip, with the two branches of the clip being attached as the shaft were in the other depictions. The clip and/or its fork could be sheathed in silicone.

Of course, the present invention is not limited to the different variants described for the culinary instrument involved. It could be applied to culinary instruments, in particular for mixing or serving (in kitchen or at the table), other than the whisk described above.

What is claimed is:

1. A wire whisk for mixing one or more substances, comprising:
    a handle;
    an active part extending from the handle and comprising two or more wire loops, each having a free end at a distance approximately the same as a first distance from said handle; and
    an attachment clip comprising a wire loop
    having two loop ends affixed to said handle, and a free end comprising a portion of the wire loop equidistant from each of the two loop ends, said free end being at a second distance from said handle, said second distance being no more than 40% of said first distance,
    the attachment clip further comprising a contact portion between the two loop ends and the free end,
    the attachment clip having between the two loop ends and the free end an angled shape with a concavity facing the two or more wire loops having a free end at a distance approximately the same as said first distance from said handle, and
    the attachment clip being sufficiently shaped to produce an elastic return force with predetermined elasticity and flexibility features between the contact portion and the one or more wire loops of the first length.

2. The whisk according to claim 1, wherein the features of elasticity and flexibility of the attachment clip are a function of the stiffness in flexure of the active part in an area of the active part being contacted by the free end of the clip.

3. The whisk according to claim 1, wherein the attachment clip has two substantially parallel branches.

4. The whisk according to claim 1, wherein the free end of the attachment clip is curved back towards the outside of the whisk.

5. The whisk according to claim 1, wherein the handle is at least partially implemented in silicone material.

6. The whisk according to claim 1, wherein said second distance is at least ¼ of said first distance.

7. The whisk according to claim 1, wherein said second distance is at approximately ⅓ of said first distance.

8. The whisk according to claim 1, wherein said angled shape is partially defined by a first angle relative to a longitudinal axis of said handle, and second angle defining said concavity.

9. The whisk according to claim 8, wherein said first angle is between 30 degrees and 90 degrees.

10. The whisk according to claim 8, wherein said second angle is between 90 degrees and 135 degrees.

11. The whisk according to claim 8, wherein said second angle is selected as a function of the first angle.

12. The whisk according to claim 8, wherein said second angle is selected to optimize attachment of said attachment clip to a container.

13. The whisk according to claim 1, wherein said attachment clip wire loop comprises molded steel wire coated with a silicone material.

* * * * *